(12) United States Patent
Songkakul et al.

(10) Patent No.: US 8,224,282 B2
(45) Date of Patent: Jul. 17, 2012

(54) METHOD AND DEVICE TO MANAGE POWER OF WIRELESS MULTI-SENSOR DEVICES

(75) Inventors: Pornsak Songkakul, Mequon, WI (US); William Thomas Pienta, Prospect Heights, IL (US); James J. Coogan, Des Plaines, IL (US); Randall J. Amerson, Spring Grove, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 576 days.

(21) Appl. No.: 12/406,799

(22) Filed: Mar. 18, 2009

(65) Prior Publication Data

US 2009/0240353 A1  Sep. 24, 2009

Related U.S. Application Data

(60) Provisional application No. 61/037,739, filed on Mar. 19, 2008.

(51) Int. Cl.
*G06F 17/00* (2006.01)
*G08B 1/00* (2006.01)
*G08B 21/00* (2006.01)

(52) U.S. Cl. ............... 455/343.1; 340/286.01; 340/540

(58) Field of Classification Search ............... 455/343.1; 340/286.01, 540, 521, 539.17, 539.22, 683, 340/870.01
See application file for complete search history.

(56) References Cited

U.S. PATENT DOCUMENTS

| | | | |
|---|---|---|---|
| 6,437,692 B1 * | 8/2002 | Petite et al. | 340/540 |
| 7,053,767 B2 * | 5/2006 | Petite et al. | 340/531 |
| 2002/0125998 A1 * | 9/2002 | Petite et al. | 340/286.01 |

* cited by examiner

*Primary Examiner* — Daniel D Chang (57) ABSTRACT

An automation component configured for wireless communication within a building automation system is disclosed. The automation component includes a multi-sensor package, a wireless communications component, a processor in communication with the wireless communications component and the sensor package, and a memory in communication with the processor. The memory configured to store sensor data provided by the sensor package and computer readable instructions which are executable by the processor, wherein the computer readable instructions are programmed to receive status information related to sensor data in control at a second automation component in communication with the building automation system, and communicate a portion of the stored sensor data corresponding to the received status information to the second automation component.

25 Claims, 7 Drawing Sheets

METHOD AND DEVICE TO MANAGE POWER OF WIRELESS MULTI-SENSOR DEVICES

PRIORITY CLAIM

This patent document claims the priority benefit provided under 35 U.S.C. §119(e) to U.S. provisional patent application Ser. No. 61/037,739, filed on Mar. 19, 2008. The content of this provisional patent application is incorporated herein by reference for all purposes.

BACKGROUND

The present disclosure generally relates to communications within a building automation system. In particular, the present disclosure relates to methods and devices for communicating change-of-value information within a building automation system.

A building automations system (BAS) typically integrates and controls elements and services within a structure such as the heating, ventilation and air conditioning (HVAC) system, security services, fire systems and the like. The integrated and controlled systems are arranged and organized into one or more floor level networks (FLNs) containing application or process specific controllers, sensors, actuators, or other devices distributed or wired to form a network. The floor level networks provide general control for a particular floor or region of the structure. For example, a floor level network may be an RS-485 compatible network that includes one or more controllers or application specific controllers configured to control the elements or services within floor or region. The controllers may, in turn, be configured to receive an input from a sensor or other device such as, for example, a room temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given floor level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included floor level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a floor level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Wireless devices for use within the building automation system must operate for an extended period on a limited battery charge. Systems, devices and methods to maximize power conservation may be desirable to extend and/or maximize the operating life of wireless devices and the network in which they operate.

SUMMARY

The present disclosure generally provides for communicating information between wireless devices and/or automation components operating within a building automation system (BAS). Wireless devices and/or automation components may be configured to optimize radio and/or data communications to extend battery life.

In one embodiment, an automation component configured for wireless communication within a building automation system is disclosed. The automation component includes a multi-sensor package, a wireless communications component, a processor in communication with the wireless communications component and the sensor package, and a memory in communication with the processor. The memory configured to store sensor data provided by the sensor package and computer readable instructions which are executable by the processor, wherein the computer readable instructions are programmed to receive status information related to sensor data in control at a second automation component in communication with the building automation system, and communicate a portion of the stored sensor data corresponding to the received status information to the second automation component.

In another embodiment, an automation component configured for wireless communication within a building automation system is disclosed. The automation component includes a multi-sensor package, a wireless communications component, a processor in communication with the wireless communications component and the sensor package, a memory in communication with the processor, the memory configured to store sensor data provided by the sensor package and computer readable instructions which are executable by the processor. The computer readable instructions are programmed to receive status data related to sensor data in control at a second automation component in communication with the building automation system, determine the sensor data in control at the second automation component based on the received status data, and communicate the stored sensor data corresponding the sensor data in control at the second automation component.

In another embodiment, an automation component configured for wireless communication within a building automation system is disclosed. The automation component includes, a multi-sensor package, a wireless communications component, a processor in communication with the wireless communications component and the sensor package, a memory in communication with the processor, the memory configured to store sensor data provided by the sensor package and computer readable instructions which are executable by the processor. The computer readable instructions are programmed to receive a wake-up command from a second automation component, communicate stored sensor data related to the sensor data in control at a second automation component, and receive a power-down command from the second automation component.

A method for providing power saving wireless communication within a building automation system is disclosed. The method includes scanning sensor data associated with a multi-sensor package of a first automation component, identifying changed sensor values within the sensor data, receiving a first communication from a second automation component in communication with the first automation component and the building automation system, and communicating a portion of the identified changed sensor values associated with the first communication received from the second automation component.

Additional features and advantages of the present invention are described in, and will be apparent from, the following Detailed Description and the figures.

BRIEF DESCRIPTION OF THE FIGURES

The method, system and teaching provided relate to binding automation components within a building automation system (BAS).

DETAILED DESCRIPTION

The embodiments discussed herein include automation components, wireless devices and transceivers. The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein. Moreover, the disclosed building automation system describes automation components that may include separate wireless devices and transceivers, however it will be understood that that the wireless device and transceiver may be integrated into a single automation component operable within the building automation system.

I. Building Automation System Overview

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as known wireless communications standards such as, for example, IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, automation components configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection with an RJ11 or other type of connector, an RJ45 Ethernet compatible port, and/or a universal serial bus (USB) connection. These wired, wireless devices or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b . . . 802.11n, etc.) These exemplary wired, wireless devices may further include a man-machine interface (MMI) such as a web-based interface screen that provide access to configurable properties of the device and allow the user to establish or troubleshoot communications between other devices and elements of the BAS.

Figure 1:
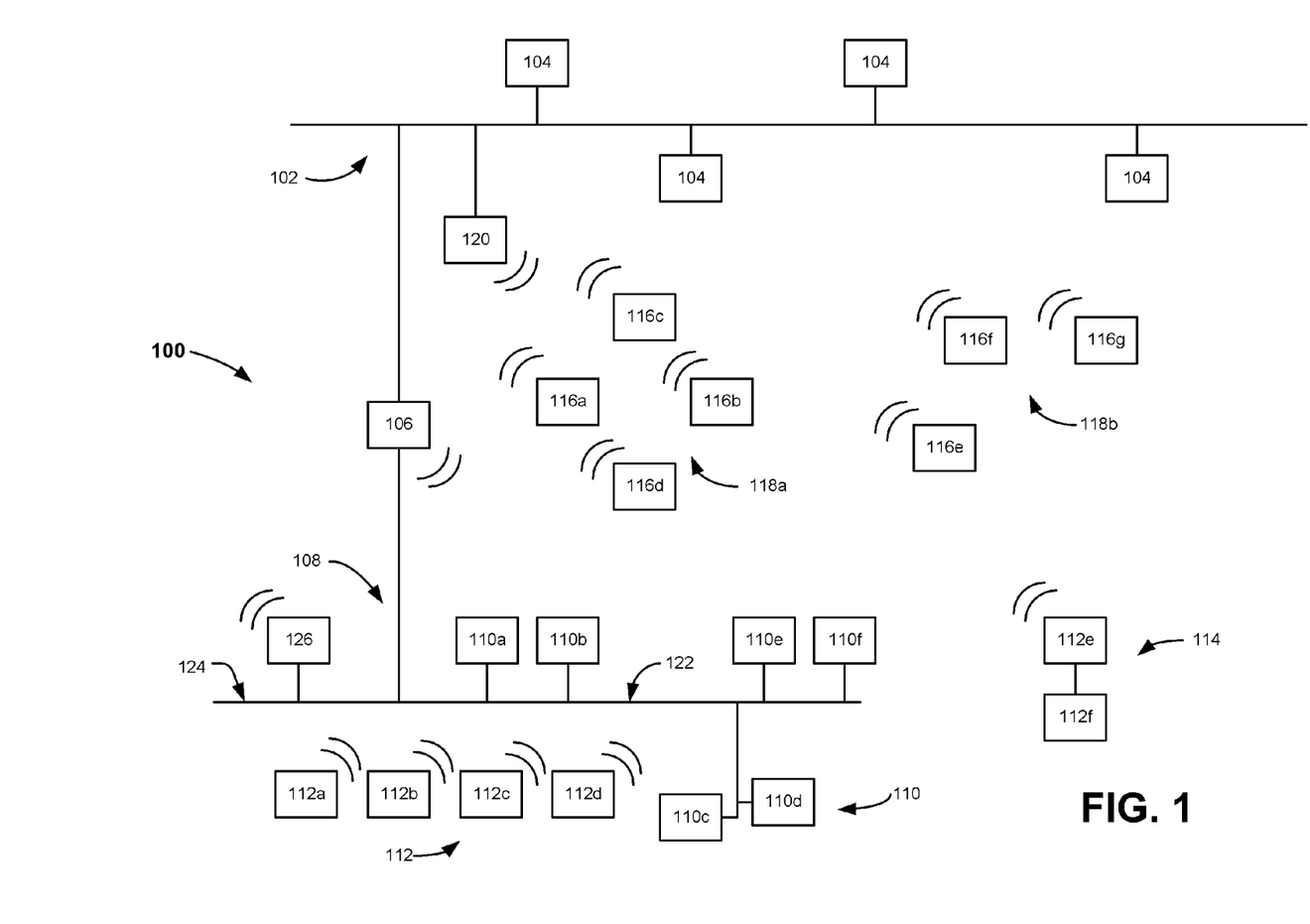
FIG. 1 illustrates an embodiment of a building automation system configured in accordance with the disclosure provided herein.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a floor level network (FLN). The second network 108, in this exemplary embodiment, may include a first wired network portion 122 and a second wired network portion 124 that connect to building automation components 110 (individually identified as automation components 110a to 110f). The second wired network portion 124 may be coupled to wireless building automation components 112 via the automation component 126. For example, the building automation components 112 may include wireless devices individually identified as automation components 112a to 112f. In one embodiment, the automation component 112f may be a wired device that may or may not include wireless functionality and connects to the automation component 112*e*. In this configuration, the automation component 112*f* may utilize or share the wireless functionality provided by the automation component 112*e* to define an interconnected wireless node 114. The automation components 112*a* to 112*f* may, in turn, communicate or connect to the first network 102 via, for example, the controller 106 and/or an automation component 126. The automation component 126 may be a field panel, FPX or another full function device in communication with the second wired network portion 124 which, in turn, may be in communication with the first network 102.

The control system 100 may further include automation components generally identified by the reference numerals 116*a* to 116*g*. The automation components 116*a* to 116*g* may be configured or arranged to establish one or more networks or subnets 118*a* and 118*b*. The automation components 116*a* to 116*g* such as, for example, full or reduced function devices and/or a configurable terminal equipment controller (TEC), cooperate to wirelessly communicate information between the first network 102, the control system 100 and other devices within the mesh networks or subnets 118*a* and 118*b*. For example, the automation component 116*a* may communicate with other automation components 116*b* to 116*d* within the mesh network 118*a* by sending a message addressed to the network identifier, alias and/or media access control (MAC) address assigned to each of the interconnected automation components 116*a* to 116*g* and/or to a field panel 120. In one configuration, the individual automation components 116*a* to 116*d* within the subnet 118*a* may communicate directly with the field panel 120 or, alternatively, the individual automation components 116*a* to 116*d* may be configured in a hierarchal manner such that only one of the components for example, automation component 116*c*, communicates with the field panel 120. The automation components 116*e* to 116*g* of the mesh network 118*b* may, in turn, communicate with the individual automation components 116*a* to 116*d* of the mesh network 118*a* or the field panel 120.

The automation components 112*e* and 112*f* defining the wireless node 114 may wirelessly communicate with the second network 108, and the automation components 116*e* to 116*g* of the mesh network 118*b* to facilitate communications between different elements, section and networks within the control system 100. Wireless communication between individual the automation components 112, 116 and/or the subnets 118*a*, 118*b* may be conducted in a direct or point-to-point manner, or in an indirect or routed manner through the nodes or devices comprising the nodes or networks 102, 108, 114 and 118. In an alternate embodiment, the first wired network portion 122 is not provided, and further wireless connections may be utilized.

Figure 2:
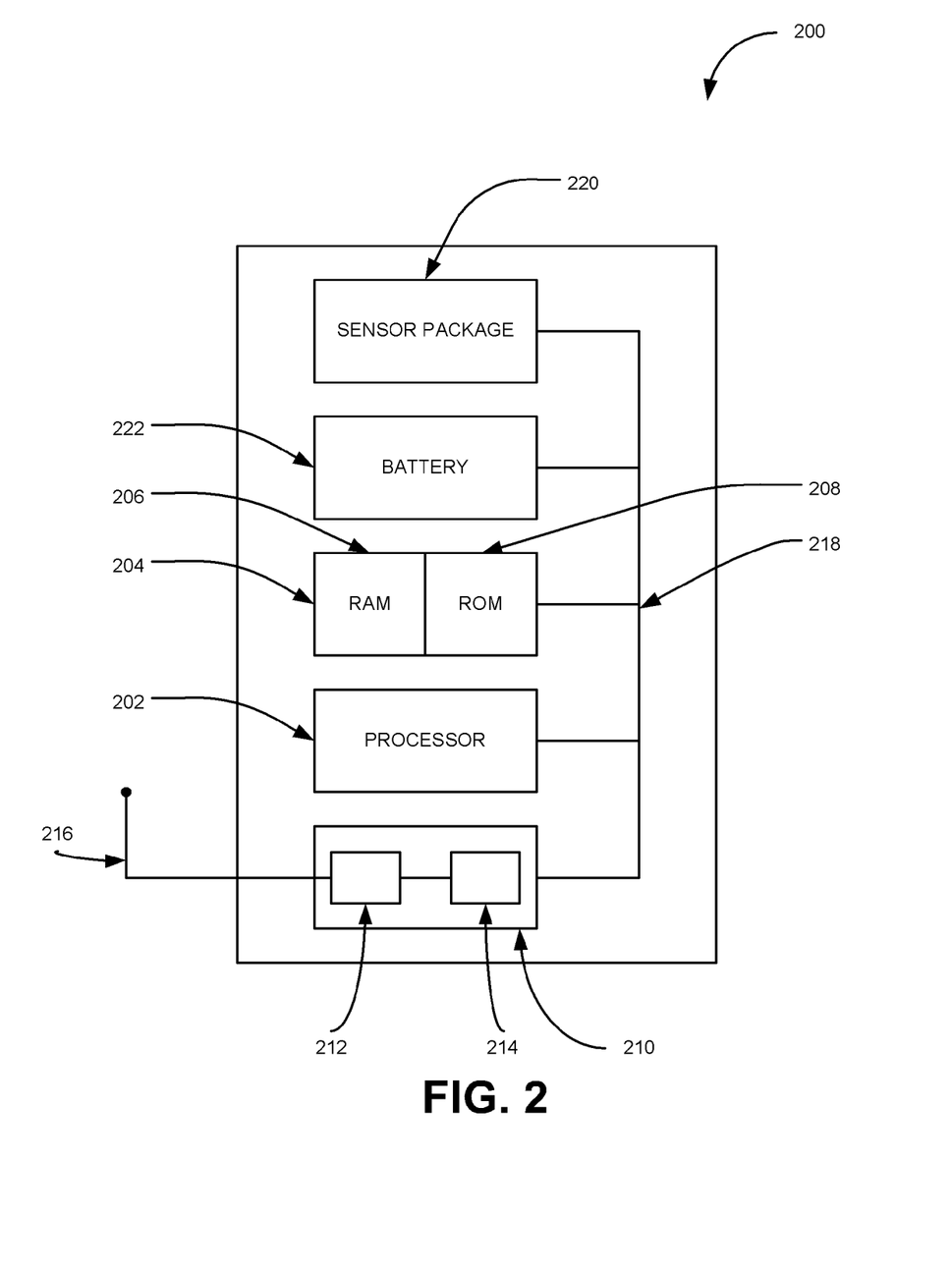
FIG. 2 illustrates an embodiment of a wireless device or automation component that may be utilized in connection with the building automation system shown in FIG. 1.

FIG. 2 illustrates an exemplary automation component 200 that may be utilized within the control system 100. The automation component 200 maybe be a full function device or a reduced function device and may be utilized interchangeably with the automation components 110, 112 and 116 shown and discussed in connection with FIG. 1. The automation component 200 in this exemplary embodiment may include a processor 202 such as an INTEL® PENTIUM, an AMD® ATHLON™, an Atmel® ATMega, or other 8, 12, 16, 24, 32 or 64 bit classes of processors in communication with a memory 204 or storage medium. The memory 204 or storage medium may contain random access memory (RAM) 206, flashable or non-flashable read only memory (ROM) 208 and/or a hard disk drive (not shown), or any other known or contemplated storage device or mechanism. The automation component may further include a communications component 210. The communications component 210 may include, for example, the ports, hardware and software necessary to implement wired communications with the control system 100. The communications component 210 may alternatively, or in addition to, contain a wireless transmitter 212 and a receiver 214 communicatively coupled to an antenna 216 or other broadcast hardware.

The sub-components 202, 204 and 210 of the exemplary automation component 200 may be coupled and able to share information with each other via a communication bus 218. In this way, computer readable instructions or code such as software or firmware may be stored on the memory 204. The processor 202 may read and execute the computer readable instructions or code via the communication bus 218. The resulting commands, requests and queries may be provided to the communications component 210 for transmission via the transmitter 212 and the antenna 216 to other automation components 200, 112 and 116 operating within the first and second networks 102 and 108. Sub-components 202-218 may be discrete components or may be integrated into one (1) or more integrated circuits, multi-chip modules, and/or hybrids.

The automation component 200 may be a multi-sensor wireless device that includes a sensor package 220 in communication with the sub-components 202, 204 and 210 via the communication bus 218. The sensor package 220 may be configured to sense or detect a variety of variables such as, for example, temperature, humidity, carbon dioxide, carbon monoxide, volatile organic compounds, etc. Sensed values, signals and other data may be stored within the memory 204 and accessible to the processor 202. Moreover, the signal or indication may be flagged to indicate that a change-of-value has occurred within the automation component 200. In other words, the detection or reception of the signal or indication may operate as a change-of-value flag which denotes that the information, setting, signals and/or indications stored within the memory 204 have been altered, updated or otherwise changed. Alternatively, a separate change-of-value flag may be set and/or correspond to each detected or received signal or indication.

A battery 222 may power the sub-components 202, 204, 210 and 220 via the communication bus 218, direct or hardwired connections via a circuit board, one or more wires or conduits or any other suitable power communication medium. Communication of the stored sensor readings and/or data via the communication component 210 is a power intensive operation that may drain the battery 222. Moreover, some of the sensors within the sensor package 220 may require a great deal of power to operate. In order to increase the life of the battery 222, the high power requirement sensors within the sensor package 220 may be configured to operate periodically or on a set schedule.

II. Automation Component Communication and Updating

Figure 3:
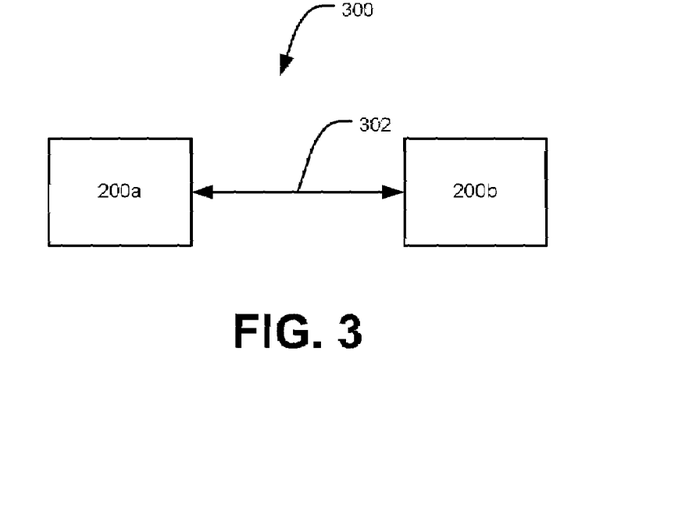
FIG. 3 illustrates an exemplary flowchart representative of a communications and updating configuration.

FIG. 3 illustrates an exemplary communications and updating configuration 300 that may be implemented between automation components 200. In this exemplary configuration, the automation components 200*a* may be configured to implement a request-response (polling) communication 302 in order to pull information from 200*b* device(s) to the polling device or for the 200*b* device to push values up to the 200*a* device. For example, the automation component 200*a* may represent a field panel, FPX or another full function device. Similarly, the automation component 200*b* may represent a TEC, FLNX, a Full function or reduced function device, a wireless actuator or any other wired or wireless device operable within the BAS 100. Moreover, the automation components 200*a*, 200*b* may be operative within, for example, the mesh network or subnet 118*a*.

A. Request-Response (Polled) Communications

Figure 4:
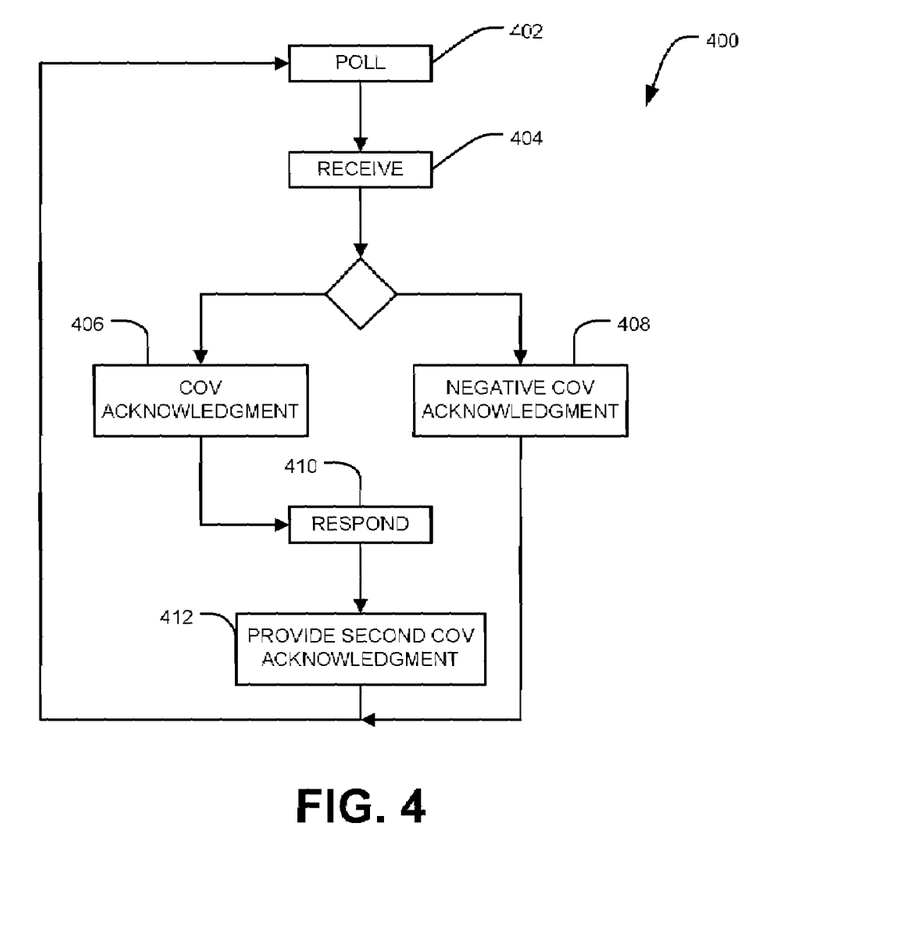
FIG. 4 illustrates an exemplary flowchart representative of a communications algorithm.

FIG. 4 illustrates a poll communication algorithm 400 or method that may be implemented, for example, between the automation components 200a, 200b. At block 402, the automation component 200a, which may be a field panel or other full function device, may generate and communicate a change-of-value (COV) request message to one or more automation components 200b operating within the BAS 100 and/or within the individual FLNs that make up the BAS 100. The COV request message may request or direct the automation component 200b to indicate whether any of the local detected values, received values, parameters, or measurements have changed or altered beyond a pre-defined reporting limit, e.g. COV limit.

At block 404, the automation component 200b receives the COV request message. For example, if the automation component 200b has, since receipt of the last COV request message, detected or received a new value representing the change-of-value, then at block 406 the automation component 200b may generate a COV acknowledgment message for communication to the automation component 200a. Alternatively, if the automation component 200b hasn't detected or received the new value representing the change-of-value, then at block 408 the automation component 200b may generate a negative COV acknowledgment message for communication to the automation component 200a.

At block 410, if the automation component 200a has successfully received the COV acknowledgment message provided by the automation component 200b, then the automation component 200a may generate and send an acknowledge COV request message for reply to the automation component 200b.

At block 412, the automation component 200b, in response to the acknowledge COV request message provided by the automation component 200a, knows the COV was successfully transferred to the device 200a and clears those reported COV's, and provides a acknowledge COV request acknowledgment message. After block 412, the communication algorithm 400 may restart and another wireless device or automation component within the BAS 100 may be polled. It will be understood that the exemplary communications algorithm 400 may be implemented in a wired or wireless BAS 100

B. Push Communications

Figure 5:
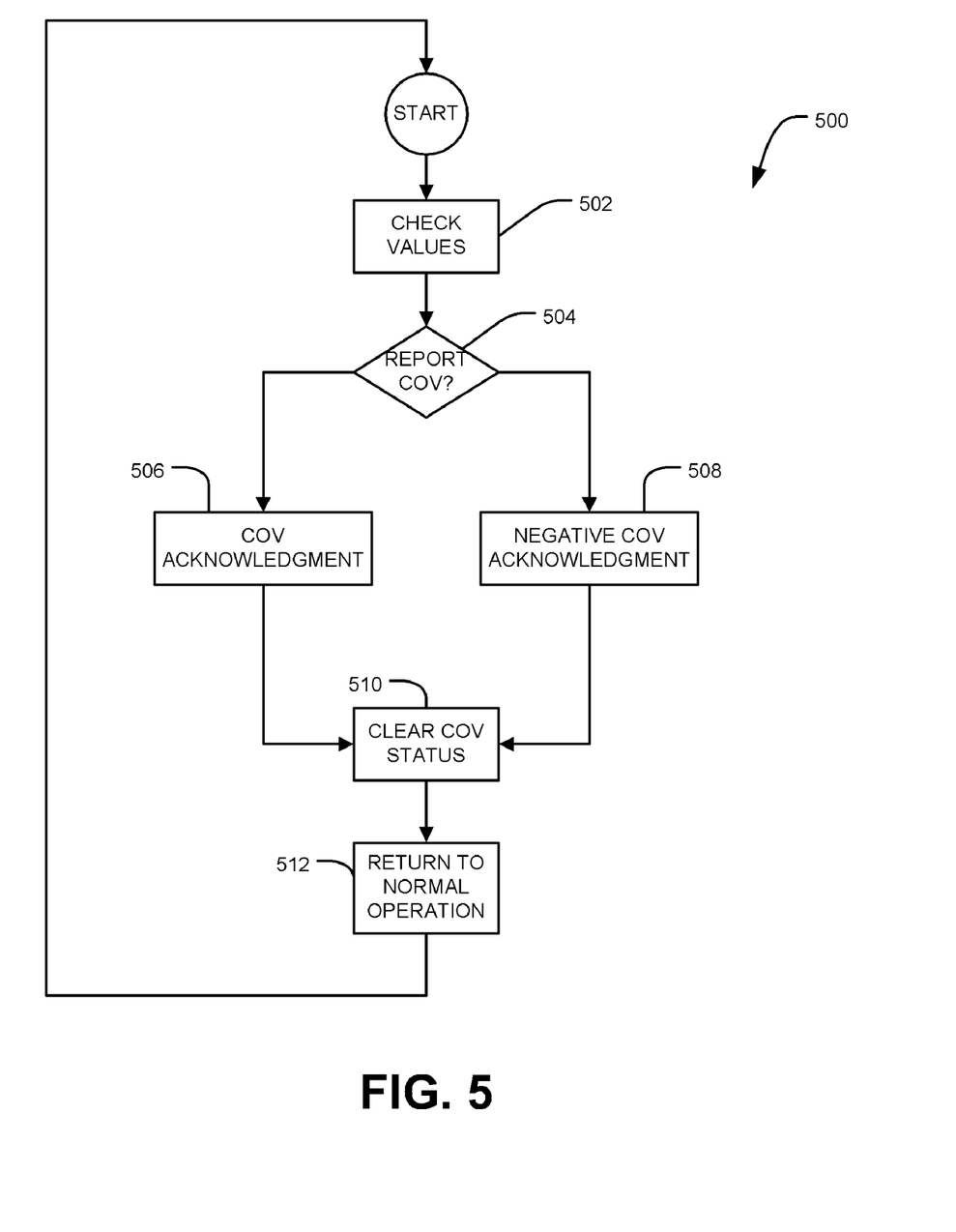
FIG. 5 illustrates an exemplary flowchart representative of another communications algorithm.

FIG. 5 illustrates an alternate communication algorithm 500 or method that may be implemented, for example, between the automation components 200a, 200b. The exemplary communication method 500 may be employed in a BAS 100 configured for hybrid communications utilizing both wired and wireless communications.

At block 502, the automation component 200b, which may be, for example, a full function device, an FLNX and or a TEC, will check its inputs and outputs for new or changed values. If the new value has changed more than a pre-defined amount from the last reported value, then the variable is to be reported on the next COV communication.

At block 504, the automation component 200b will check, at regular intervals established by an internal COV Reporting time interval or as needed by the internal algorithm, to see if Change-Of-Value (COV) are waiting to be reported. If so, the automation component 200b will create a Push COV message containing all queued COV values and send them to automation component 200a. At block 506, the automation component 200a may respond to automation component 200b with a Push COV acknowledge response if the message is received and understood, or, at block 508, will respond with a negative acknowledge (NAK) and an error code if the message was not understood. On receipt, at block 510, automation component 200b clears the COV status. At block 512, the automation component 200b may return to its normal operations until the next check for new values.

Automation component 200a now processes those queued COV's into the internal database of the automation component 200a and may optionally report those new values to other devices as defined in the drawings and description of FIG. 1.

If automation component 200b was in fact a hardwired device with an external wireless network interface, such as a TEC with an FLNX configuration, then the FLNX would need to poll the TEC for COV's and hold them within the FLNX while the communication to automation component 200a was occurring. In addition, the FLNX would need to acknowledge the COV's from the TEC as was defined in algorithm of FIG. 4.

If automation component 200a was a hardwired device with an external wireless network interface, such as a field panel with an FPX, then the FPX would need to act has the buffer for pushed COV's and queue the COV's for the field panel. The field panel would poll the FPX, in accordance with the algorithms of FIG. 4, to accept the COV's into the database of the automation component 200a.

In this configuration, the communication algorithm 500 allows COV related messages to be gathered and pushed from one or more automation components 200b up to the 200a device and from the 200a device to other system components as defined in FIG. 1. By pushing COV's up to automation component 200a as opposed to polling each automation component 200b, less wireless bandwidth is used and system end to end delays shortened.

If the automation component 200b is operating in a stable state without any COV's for extended periods of time (as defined by internal variable), the automation component 200b will communicate with the automation component 200a so that the automation component 200a knows that the automation component 200b is still operating. If the automation component 200a does not receive a message from the automation component 200b for a period longer than the internal variable defined within the automation component 200b, then the automation component 200a will report a loss of communication with the automation component 200b.

The communications algorithm 500 may be further configured to address and handle communications difficulties or errors between, for example, the automation components 200a, 200b. For example, if COV polling requests cannot be communicated or are not acknowledged by the intended receiving automation component, then the algorithm 500 may be configured to recover from the communications failure. Communication recovery may include repeating communication attempts a predetermined number of times (e.g., ten attempts). Similarly, if repeated communication attempts are unsuccessful, then the communication recovery may timeout and the procedure may be reattempted after a predetermined delay (e.g., every thirty minutes). Moreover, during the period when communication is not possible, the COV-related messages may still be aggregated and stored pending the reestablishment of communications.

III. Automation Component Communication and Power Saving

Figure 6:
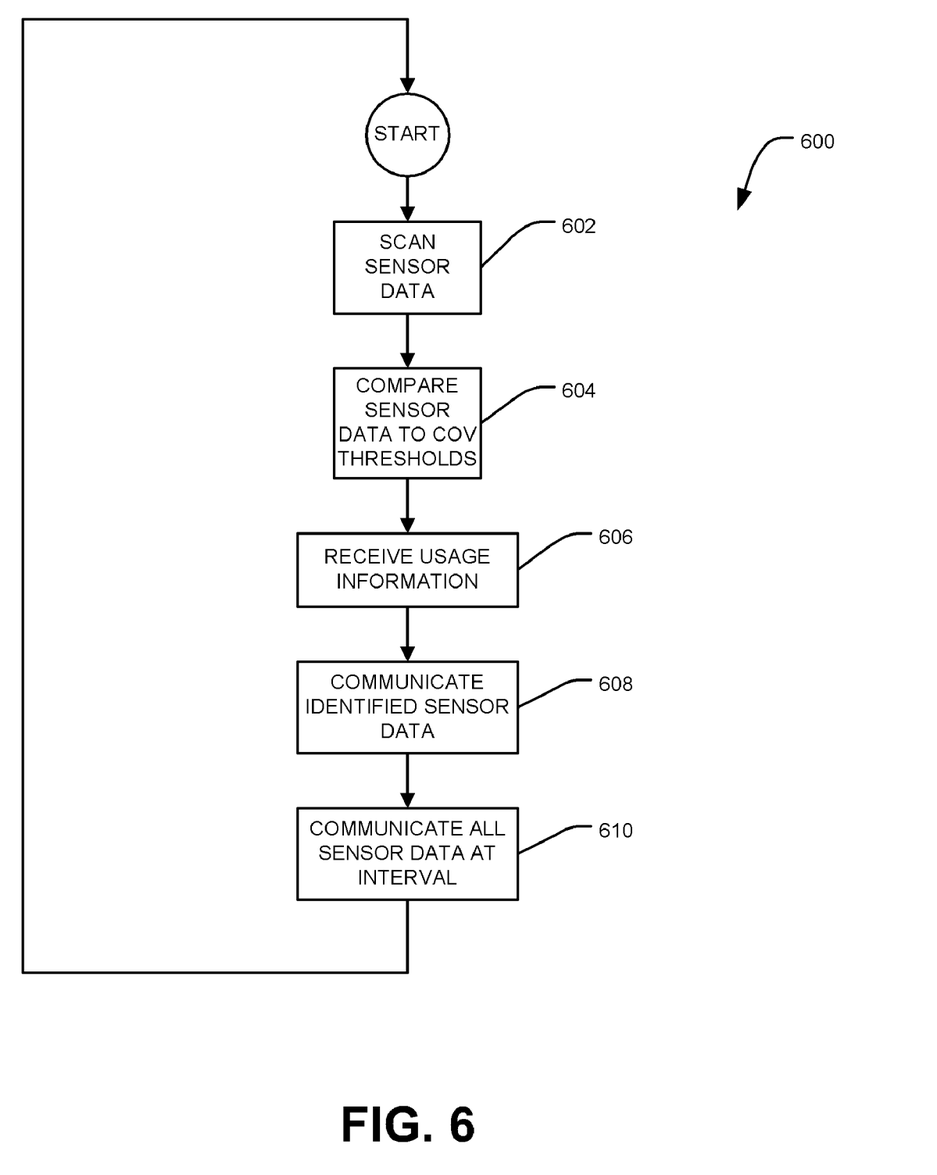
FIG. 6 illustrates an exemplary flowchart representative of a communications and power saving configuration.

FIG. 6 illustrates a power saving communication algorithm 600 or method that may be implemented, for example, between the field panel 120 and the automation component 200. Generally, the power saving communication algorithm 600 instructs the automation component 200 to provide specific or limited sensor information to, for example, the field panel 120 in response to a communication indicating the particular sensed data (from a field of all the data gathered via the multi-sensor) currently in use by the field panel 120.

At block 602, the exemplary multi-sensor automation component 200 scans each of the sensors operating within the sensor package 220 and/or the sensor data stored in the memory 204. The scan time may be, for example, once every 10 msecs, once a second, or any other desirable period of time.

At block 604, the sensor data identified during the sensor and memory scan may be compared to a COV threshold value corresponding to each individual sensor and/or sensor value. Sensor data found to exceed the COV threshold may be flagged for later transmission.

At block 606, a receiving device such as, for example, the field panel 120 may communicate sensor usage or control information to the automation component that identifies which sensor and sensor data is currently being analyzed and/or is primary or controlling the field panel 120. The sensor usage or control information relates to or identifies the sensor values and routines that are controlling and driving the receiving device. In other words, during any given scan cycle, one of the sensor values and/or a corresponding sensor control routine is executed by the receiving device (e.g., the field panel 120). The communicated sensor control information provided by the receiving device identifies for the automation component 200 which sensor and/or sensor value is driving or controlling the receiving device during the scan cycle.

At block 608, the automation component 200 may communicate the flagged sensor data corresponding to the primary sensor and/or sensor value in control of, and provided by, the field panel 120.

At block 610, all of the flagged sensor data, regardless of its status at the field panel 120, may be communicated (at a regular or scheduled interval) to provide sensor data for the sensors that are not the primary focus of the field panel during a given time period or duty cycle. In this way, the overall length and frequency of communications may be reduced thereby saving battery power. Moreover, by only communicating a subset of the total sensor data reduces the overall message size thereby freeing network bandwidth for other communications.

Figure 7:
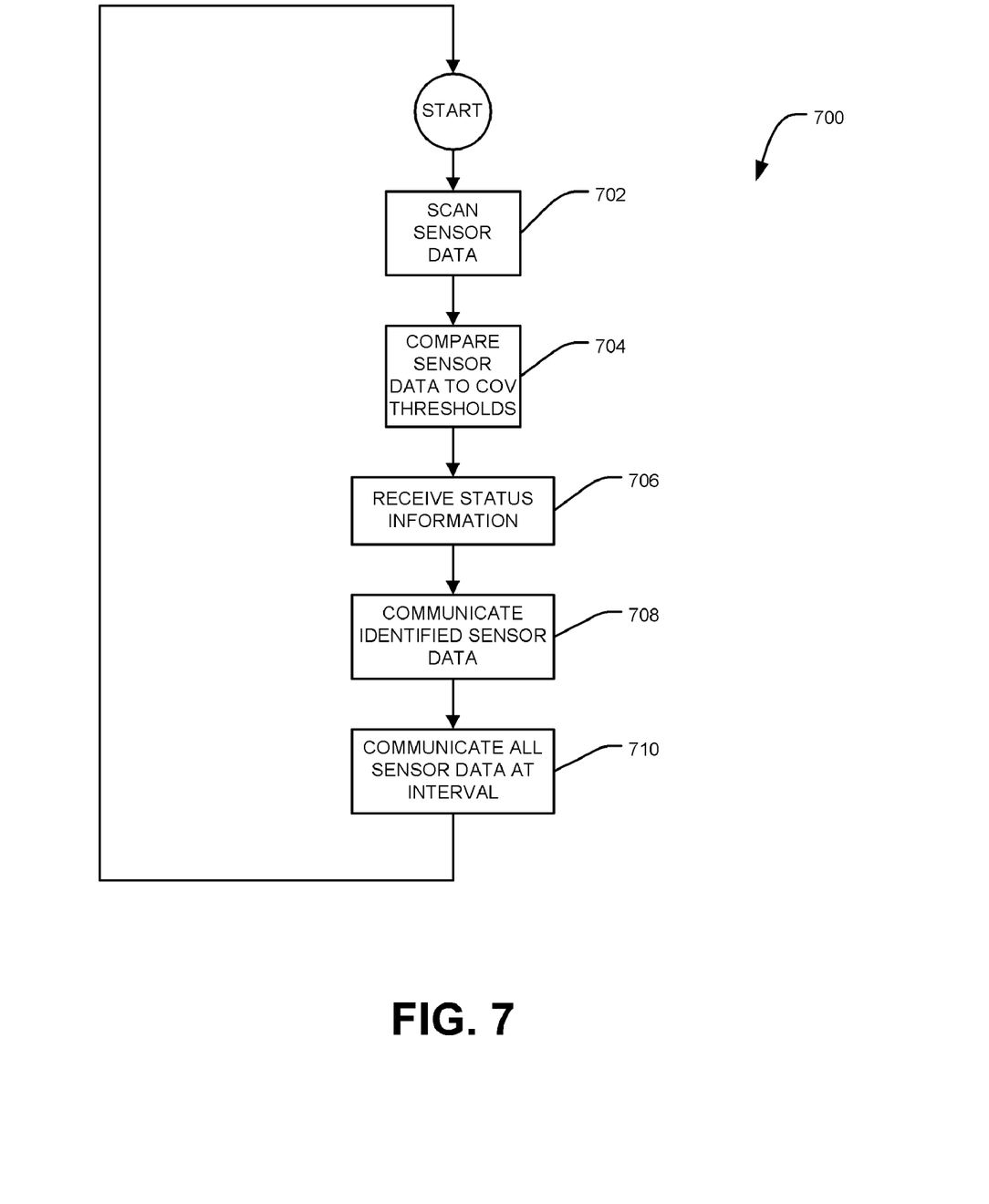
FIG. 7 illustrates an exemplary flowchart representative of a communications and power saving algorithm.

FIG. 7 illustrates an alternate power saving communication algorithm 700 or method that may be implemented between, for example, the field panel 120 and the automation components 200. Generally, the power saving communication algorithm 700 is configure to allow the automation component 200 to determine, in response to data provided by the field panel 120, to determine the sensed data currently in use by the field panel 120.

At block 702, the exemplary multi-sensor automation component 200 scans each of the sensors operating within the sensor package 220 and/or the sensor data stored in the memory 204. The scan time may be, for example, once every 10 msecs, once a second, or any other desirable period of time.

At block 704, the sensor data identified during the sensor and memory scan may be compared to a COV threshold value corresponding to each individual sensor and/or sensor value. Sensor data found to exceed the COV threshold may be flagged for later transmission.

At block 706, a receiving device such as, for example, the field panel 120 may communicate status information to the automation component 200. The received status information provides the complete status for each of the control routines or algorithm running in connection with each of the sensor elements in the sensor package 220. The automation component 200, and more particularly, the processor 202, may analyze or process to all of the received status information to determine which sensor and sensor data is currently being analyzed and/or is primary or controlling the field panel 120.

At block 708, the automation component 200 may communicate the flagged sensor data corresponding to the sensor and sensor data currently being analyzed and/or controlling the field panel 120.

At block 710, all of the flagged sensor data, regardless of its status at the field panel 120, may be communicated (at a regular or scheduled interval) to provide sensor data for the sensors that are not the primary focus of the field panel during a given time period or duty cycle. In this way, the overall length and frequency of communications may be reduced thereby saving battery power. Moreover, by only communicating a subset of the total sensor data reduces the overall message size thereby freeing network bandwidth for other communications.

Figure 8:
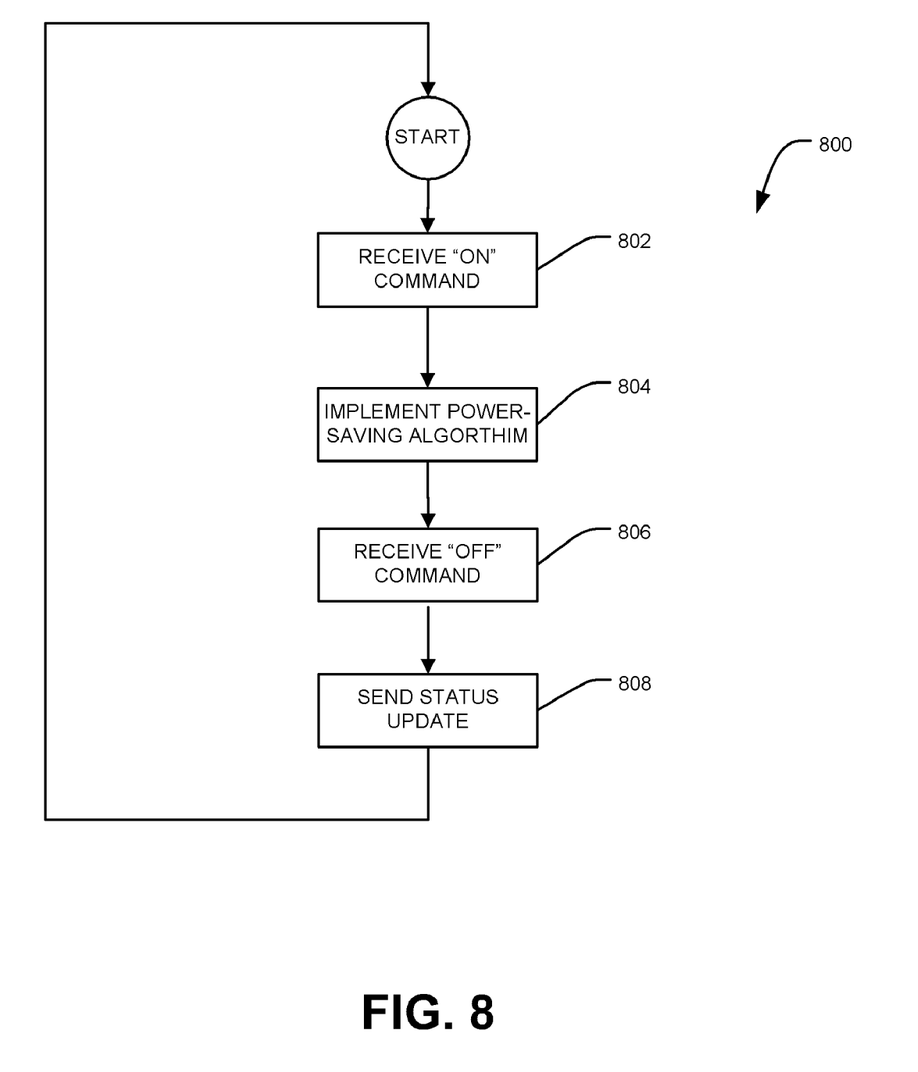
FIG. 8 illustrates an exemplary flowchart representative of another communications and power saving algorithm.

FIG. 8 illustrates another power saving communication algorithm 800 or method that may be implemented between, for example, the field panel 120 and the automation components 200. Generally, the power saving communication algorithm 800 provides for changing the power status of the automation component 200 in response to a command from the field panel 120.

At block 802, the exemplary multi-sensor automation component 200 may receive a "WAKE-UP" or "ON" command from another device such as, for example, the field panel 120. Prior to receipt of the ON command, the automation component 200 may have been in a low-power state.

At block 804, the now-active automation component may implement the power saving communication algorithm 700 and/or 800.

At block 806, the exemplary multi-sensor automation component 200 may receive a "POWER DOWN" or "OFF" command from another device such as, for example, the field panel 120. Upon receipt of the OFF command, the automation component 200 may return to a low-power state.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. An automation component configured for wireless communication within a building automation system, the automation component comprising:
   a multi-sensor package configured to detect a plurality of variables and generate sensor data for each detected variable;
   a wireless communications component;
   a processor in communication with the wireless communications component and the sensor package;
   a memory in communication with the processor, the memory configured to store sensor data provided by the sensor package and computer readable instructions which are executable by the processor; wherein the computer readable instructions are programmed to:
     receive sensor control information related to sensor data in control at a second automation component in communication with the building automation system; and
     communicate a portion of the stored sensor data corresponding to the received sensor control information to the second automation component.

2. The automation component of claim 1, wherein the sensor package includes one or more sensors selected from the group consisting of: a temperature sensor; a humidity sensor; a carbon monoxide sensor; a carbon dioxide sensor and a volatile organic compound sensor.

3. The automation component of claim 1, wherein the computer readable instructions are further programmed to:
identify sensor values within the sensor data that exceed a corresponding change-of-value threshold.

4. The automation component of claim 1, wherein the computer readable instructions are further programmed to:
set an identification flag for each identified sensor value.

5. The automation component of claim 1, wherein the computer readable instructions are further programmed to:
communicate all of the stored sensor data corresponding to the received sensor control information to the second automation component.

6. The automation component of claim 1, wherein all of the stored sensor data is communicated at a regular interval.

7. An automation component configured for wireless communication within a building automation system, the automation component comprising:
a multi-sensor package configured to generate a plurality of sensor data for each sensor within the multi-sensor package;
a wireless communications component;
a processor in communication with the wireless communications component and the sensor package;
a memory in communication with the processor, the memory configured to store sensor data provided by the sensor package and computer readable instructions which are executable by the processor; wherein the computer readable instructions are programmed to:
receive status data related to sensor data in control at a second automation component in communication with the building automation system;
determine the sensor data in control at the second automation component based on the received status data; and
communicate the stored sensor data corresponding the sensor data in control to the second automation component.

8. The automation component of claim 7, wherein the sensor package includes one or more sensors selected from the group consisting of: a temperature sensor; a humidity sensor; a carbon monoxide sensor; a carbon dioxide sensor and a volatile organic compound sensor.

9. The automation component of claim 7, wherein the computer readable instructions are further programmed to:
identify sensor values within the sensor data that exceed a corresponding change-of-value threshold.

10. The automation component of claim 7, wherein the computer readable instructions are further programmed to:
set an identification flag for each identified sensor value.

11. The automation component of claim 7, wherein the computer readable instructions are further programmed to:
communicate all of the stored sensor data corresponding to the received status information to the second automation component.

12. The automation component of claim 7, wherein all of the stored sensor data is communicated at a regular interval.

13. An automation component configured for wireless communication within a building automation system, the automation component comprising:
a multi-sensor package configured to detect a plurality of variables and generate sensor data for each detected variable;
a wireless communications component;
a processor in communication with the wireless communications component and the sensor package;
a memory in communication with the processor, the memory configured to store sensor data provided by the sensor package and computer readable instructions which are executable by the processor; wherein the computer readable instructions are programmed to:
receive a wake-up command from a second automation component;
communicate stored sensor data related to the sensor data in control at a second automation component; and
receive a power-down command from the second automation component.

14. The automation component of claim 13, wherein the sensor package includes one or more sensors selected from the group consisting of: a temperature sensor; a humidity sensor; a carbon monoxide sensor; a carbon dioxide sensor and a volatile organic compound sensor.

15. The automation component of claim 13, wherein the computer readable instructions are further programmed to:
identify sensor values within the sensor data that exceed a corresponding change-of-value threshold.

16. The automation component of claim 13, wherein the computer readable instructions are further programmed to:
set an identification flag for each identified sensor value.

17. The automation component of claim 13, wherein the computer readable instructions are further programmed to:
communicate all of the stored sensor data corresponding to the received status information to the second automation component.

18. The automation component of claim 17, wherein all of the stored sensor data is communicated at a regular interval.

19. The automation component of claim 13, wherein the computer readable instructions are further programmed to:
receive status information related to sensor data in control at a second automation component.

20. A method for providing power saving wireless communication within a building automation system, the method comprising:
scanning sensor data associated with each of a plurality of sensors contained within a multi-sensor package of a first automation component;
identifying changed sensor values within the sensor data;
receiving a first communication from a second automation component in communication with the first automation component and the building automation system; and
communicating a portion of the identified changed sensor values associated with the first communication received from the second automation component.

21. The method of claim 20, wherein identifying changed sensor values includes identifying changed sensor values as a function of a change-of-value threshold.

22. The method of claim 20 further comprising:
determining a primary sensor routine within the second component based on the first communication.

23. The method of claim 22, wherein the first communication includes sensor control information.

24. The method of claim 22, wherein the first communication includes sensor status information for all of the sensor routines operating within the second automation component.

25. The method of claim 22, wherein the first communication identifies a primary sensor routine operating within the second automation component.

* * * * *